United States Patent
Tarkiainen et al.

(10) Patent No.: US 8,872,382 B2
(45) Date of Patent: Oct. 28, 2014

(54) COMPENSATION OF HARMONICS OF ELECTRICAL NETWORK

(75) Inventors: Antti Tarkiainen, Järvenpää (FI); Tero Viitanen, Vantaa (FI)

(73) Assignee: ABB Oy, Helsinki (FI)

( * ) Notice: Subject to any disclaimer, the term of this patent is extended or adjusted under 35 U.S.C. 154(b) by 1461 days.

(21) Appl. No.: 12/323,605

(22) Filed: Nov. 26, 2008

(65) Prior Publication Data

US 2009/0134714 A1 May 28, 2009

(30) Foreign Application Priority Data

Nov. 28, 2007 (FI) .................................. 20075852

(51) Int. Cl.
- H02J 1/02 (2006.01)
- H02J 3/18 (2006.01)
- H02J 3/01 (2006.01)

(52) U.S. Cl.
CPC ............. *H02J 3/1835* (2013.01); *Y02E 40/30* (2013.01); *H02J 3/01* (2013.01); *Y02E 40/40* (2013.01)
USPC .......................................... 307/102; 307/105

(58) Field of Classification Search
USPC ................................................ 307/102, 105
See application file for complete search history.

(56) References Cited

U.S. PATENT DOCUMENTS

| 5,221,862 | A | | 6/1993 | Fiorina et al. |
| 5,567,994 | A | * | 10/1996 | Davis et al. ................... 307/105 |
| 5,594,630 | A | | 1/1997 | Baker ............................ 363/40 |
| 6,956,352 | B2 | * | 10/2005 | Tarkiainen et al. ........... 318/800 |
| 7,057,908 | B2 | * | 6/2006 | Tarkiainen et al. ............. 363/39 |
| 2005/0015182 | A1 | | 1/2005 | Bebic et al. |
| 2005/0194944 | A1 | | 9/2005 | Folts et al. |

FOREIGN PATENT DOCUMENTS

FI 20040110 A 7/2005

OTHER PUBLICATIONS

"Instantaneous Active and Reactive Current Compensation for AC/DC Three Phase Harmonic Generating Loads", Segura et al., IEEE 0/7803-5105-3/98, copyright 1998.*
"Control of Series Active Power Filters Compensating for Source Voltage Unbalance and Current Harmonics", Lee et al., IEEE 0278-0046/04 copyright 2004.*
"Unified Active Power Filters for Source Voltage Unbalance/Current Harmonics Compensation and Power Factor Correction", Lee et al., IEE 0/7803-8730-9/04, copyright 2004.*
Jintakosonwit et al., "Implementation and Performance of Cooperative Control of Shunt Active Filters for Harmonic Damping Throughout a Power Distribution System" Industry Applications Conference, (2002), vol. 1, pp. 51-58, XP002610510.
European Search Report dated Dec. 10, 2010, issued in the corresponding European Application No. 08170078.3-2207.
Finnish Search Report, dated May 5, 2008.

* cited by examiner

*Primary Examiner* — Fritz M Fleming
(74) *Attorney, Agent, or Firm* — Buchanan Ingersoll & Rooney (57) ABSTRACT

A system and a method for compensating harmonic components or a reactive power of an electrical network. The system comprises a measurement unit (1) configured to measure an electrical quantity to be compensated, a control unit (2) configured to determine harmonics contents or a reactive power need of the measured electrical quantity to be compensated as well as to determine, as relative values, desired values corresponding with the harmonics to be compensated or the reactive power to be compensated, one or more compensation units (5, 6) configured, responsive to the desired values provided by the control unit (2), to generate harmonic components or a reactive current according to the desired values given as relative values, and a communications connection (3) configured to communicate the desired values determined by the control unit (2) to the compensation units (5, 6).

11 Claims, 4 Drawing Sheets

COMPENSATION OF HARMONICS OF ELECTRICAL NETWORK

BACKGROUND OF THE INVENTION

The invention relates to compensation of harmonics of an electrical network, and particularly to compensation to be carried out by a plurality of units in a distributed manner.

A great number of domestic and industrial electrical devices derive their current from an electrical network, the curve form of the current differing from the ideal, i.e. sinusoidally alternating, curve form. While deriving their current from the electrical network, such devices cause harmonics, i.e. harmonic components, to occur in the electrical network. Often the harmonics generated by the devices are formed at frequencies of certain multiples of the basic frequency of the electrical network. If the magnitude of the harmonics increases in a distribution network, the quality of electricity becomes so poor that the electric devices do not necessarily work or they constitute a risk factor to personal and device security.

Examples of devices generating harmonics include rectifiers and various choppers. A simple diode rectifier generates direct voltage from a supplying voltage and derives current from the network only when the voltage of the network is higher than the rectified voltage. Typically, current is derived from the network only at voltage peaks of the supplying network, in which case the current is pulse-like, thus generating harmonics to the network.

In distribution networks, typically, an aim has been to compensate the harmonic components of the network by using passive filters to form absorbing circuits for certain frequencies at which harmonic components occur.

In an industrial environment in particular, attempts have been made to compensate network harmonics by using active network bridges particularly designed for this purpose to measure the harmonics contents of the network and, on the basis of the measurement, supply the network with a current which compensates the measured harmonics of the network. The usage of an active bridge as a separate electrotechnical device for compensation is an expensive solution, and the compensation capacity of the device is limited. As the magnitudes of the harmonic components to be compensated increase, a plurality of such devices has to be coupled to the same network. Each compensation device constitutes an independent unit of its own, so it is a challenging task to implement compensation by a plurality of such parallel devices.

BRIEF DESCRIPTION OF THE INVENTION

An object of the invention is thus to provide a method and a system implementing the method so as to enable the aforementioned problems to be alleviated. The object of the invention is achieved by a method and a system which are characterized by what is stated in the independent claims. Preferred embodiments of the invention are disclosed in the dependent claims.

The invention is based on the idea that compensation of harmonics is distributed such that a plurality of differently-powered and physically separate compensation units participate in compensating the harmonics on the basis of a compensation instruction received from one device.

The solution according to the invention enables an expandable system for compensating harmonics to be implemented in a simple manner, in which system the units participating in the compensation are active converters operating at partial load, and possibly separate compensation units provided for this purpose. The system of the invention enables the size of the harmonic components of the network to be decreased by using a plurality of different devices in the same network in a simple manner. In an industrial plant, for instance, several network inverters may operate at partial load continuously. The solution of the invention enables free capacity of the network inverters to be utilized for compensating harmonics.

The invention also relates to a compensation unit as well as a device for controlling compensation of harmonic components. The method and system of the invention may be implemented in a simple manner by using the compensation unit and device of the invention.

BRIEF DESCRIPTION OF THE FIGURES

The invention is now described in closer detail in connection with the preferred embodiments and with reference to the accompanying drawings, in which.

DETAILED DESCRIPTION OF THE INVENTION

Figure 1:
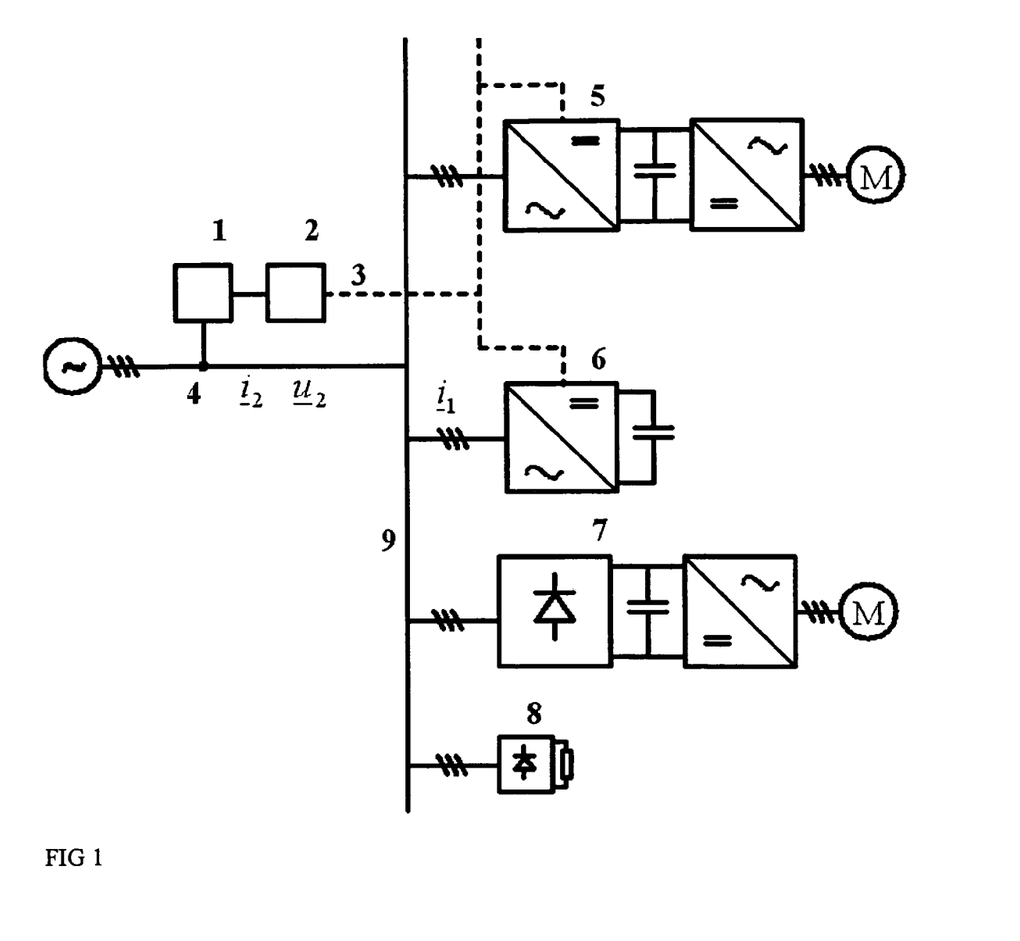
FIG. 1 shows an example of applying a system according to the invention.

FIG. 1 schematically shows a network system whereto a system according to the invention and implementing the method of the invention is applied. The system of FIG. 1 comprises a three-phase electrical network 9, which supplies motors M via frequency converters 5, 7. FIG. 1 further shows, connected to the network, a compensation unit 6 which is only responsible for compensating harmonic components of the network, and a diode bridge 8 supplying a load. As a network bridge of the frequency converter 7, a diode bridge is shown which operates in a manner similar to that of the diode bridge 8 and which generates harmonic components to the network.

A network bridge of the frequency converter 5, in turn, is implemented by active switches, which enables power to be supplied back towards the network. In such a case, it also becomes possible to compensate the harmonics of the network in a manner similar to that used in connection with the compensation unit 6 implemented for this purpose.

The system according to the invention for compensating harmonics in an electrical network comprises a measurement unit 1 configured to measure an electrical quantity to be compensated. Such an electrical quantity to be measured is e.g. a current, voltage or reactive power. Further, the system comprises a control unit 2 configured to determine the harmonics contents of the measured electrical quantity to be compensated as well as to determine desired values corresponding with the harmonics to be compensated.

The system according to the invention further comprises, as shown in FIG. 1, one or more compensation units 5, 6. The compensation units are connected through a communications connection 3 to the control unit 2, whereby the compensation units generate to the network, within the limits of the capacity of each compensation unit, harmonic components according to the desired value sent by the control unit.

An electrical quantity to be compensated may be e.g. a current supplied to the network, in which case the measurement unit 1 of the system measures the current of an access point 4 and tries to control the compensation units 5, 6 such that the curve form of the current of the access point 4 becomes as desired, i.e. typically sinusoidal.

According to a preferred embodiment of the invention, the control unit determines a phase angle of a desired value of a harmonic component in relation to a phase angle of a fundamental wave of a network voltage, and communicates this information to the compensation units via the communications connection 3. This enables a non-real-time connection to be used as the communications connection. A field bus connection, for instance, may be given as an example of such a communications connection. The compensation units, in turn, determine the phase angle of the fundamental wave of the network voltage, and proportion the communicated desired value to this phase angle of the fundamental wave. In spite of a possible slow connection, the compensation units are capable of producing internal desired values necessary for compensation quickly enough.

Further, according to a preferred embodiment of the invention, the control unit determines the desired values of the harmonic components to be sent to the compensation units as relative values such that the desired value of each harmonic amplitude to be compensated is between 0 . . . 100%. The compensation units proportion the relatively-presented harmonic amplitude instructions, according to the determination, either to their own nominal capacity or, alternatively, to their free capacity. From the relative desired values, the compensation units generate desired values for the amplitudes of the harmonics, given on an absolute scale, and an inner control circuit of the compensation unit then aims to implement these desired values. In the present context, a desired value given on an absolute scale refers to a value which can single-valuedly be transformed into a quantity of the SI system. Such a relative presentation enables the compensation load to be distributed among compensation units with different amounts of compensation resources.

In the following, the invention will be described in closer detail in connection with a preferred embodiment without, however, being restricted thereto. In the described embodiment, a harmonic to be compensated is the fifth harmonic negative sequence of a current. According to the preferred embodiment of the invention, the measurement unit 1 measures the current of an access point and the control unit 2 determines its harmonic components by means of a frequency analysis. In the case of devices utilizing a space vector presentation, it is preferable, by means of a frequency analysis, to determine current space vectors which correspond with the harmonic sequences. Typically, in a three-phase network, the largest harmonic sequences are the negative sequence of the fifth harmonic, the positive sequence of the seventh harmonic as well as the negative sequence of the eleventh harmonic and the positive sequence of the thirteenth harmonic. The space vector of a positive sequence rotates in a positive direction, i.e. in a direction of the fundamental wave of the network voltage. Correspondingly, the space vector of a negative sequence rotates in a negative direction.

Figure 2:
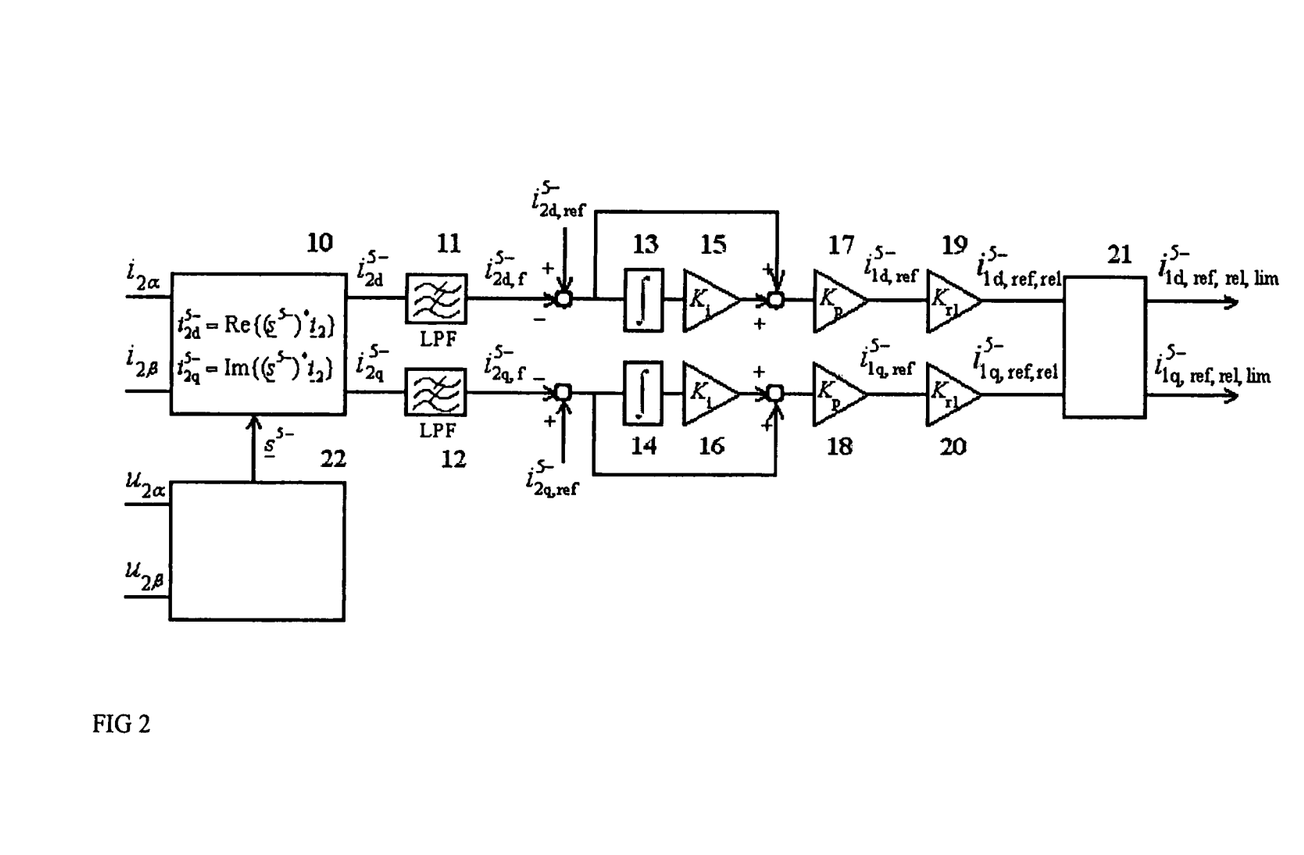
FIG. 2 is a block diagram presenting determination of harmonic current sequences according to an embodiment.

A method disclosed in U.S. Pat. No. 7,057,908 may be applied to performing a current frequency analysis, in which method the measured current space vector is transformed to a harmonic synchronous coordinate system which rotates in a direction of a sequence to be analysed at a frequency a harmonic to be analysed and wherein the control of the harmonic takes place. FIG. 2 shows a method utilizing a harmonic synchronous coordinate system for controlling the fifth negative sequence. The designations of the electrical quantities of FIG. 2 are in accordance with FIG. 1.

In the case of FIG. 2, the control unit 2 determines, by a block 22, a unit vector $\underline{s}^{5-}$ which represents the harmonic synchronous coordinate system and which, in this case, according to the superior, represents the fifth negative sequence. A harmonic orthogonal synchronous coordinate system corresponding with the harmonic in question is attached to the unit vector such that the d-axis of the coordinate system is co-directional with the unit vector, and the q-axis is perpendicular thereto. The unit vector representing the harmonic synchronous coordinate system is synchronized with the fundamental wave of the network voltage e.g. such that the unit vector representing the harmonic synchronous coordinate system and the space vector of the fundamental wave of the network voltage intersect with the positive real axis (α-axis) at the same instant of time. In practice, the unit vector representing the harmonic synchronous coordinate system may be formed by first providing a unit vector which is by a phase lock synchronized with the space vector of the fundamental wave of the network voltage. From the unit vector synchronized with the fundamental wave of the network voltage, a unit vector corresponding with the harmonic synchronous coordinate system is obtained by multiplying the angular frequency by the ordinal of the harmonic in question and by setting the rotational direction according to the rotational direction of the sequence in question. In other words, the unit vector to be produced by the block 22 rotates $\underline{s}^{5-}$ in an opposite direction and at a five-fold angular frequency with respect to the space vector of the fundamental wave of the network voltage.

In the case of the fifth negative sequence, the unit vector $$\underline{s}^{5-} = s_\alpha^{5-} + js_\beta^{5-} \tag{1}$$

may be formed e.g. in the following manner $$\underline{s}^{5-} = \cos(5\omega_s t) - j\sin(5\omega_s t), \tag{2}$$

wherein $\omega_s$ is the angular speed of the fundamental wave of the network voltage.

A block 10 of FIG. 2 is a coordinate system transformation member which transforms components $i_{2\alpha}$ and $i_{2\beta}$ of a space vector of a stationary coordinate system of the access point current to a harmonic synchronous dq-coordinate system determined by the unit vector $\underline{s}^{5-}$. For this, equations $$i_{2d}^{5-} = Re\{(\underline{s}^{5-})^* \underline{i_2}\} = s_\alpha^{5-} i_{2\alpha} + s_\beta^{5-} i_{2\beta} \tag{3}$$

$$i_{2q}^{5-} = Im\{(\underline{s}^{5-})^* \underline{i_2}\} = s_\alpha^{5-} i_{2\beta} - s_\beta^{5-} i_{2\alpha} \tag{4}$$

may be used, wherein the asterisk refers to complex conjugation. In the harmonic synchronous coordinate system, the d and q components of the current are components parallel with the d- and q-axes, i.e. scalar numbers.

Blocks 11 and 12 are low-pass filters whose purpose is to mainly remove frequencies higher than the zero frequency from signals. Output signals $i_{2d,f}^{5-}$ and $i_{2q,f}^{5-}$ of the low-pass filters represent the negative sequence of the fifth harmonics of the current of the access point, and thus they may be considered as an end result of the frequency analysis. Further, output signals $i_{2d,f}^{5-}$ and $i_{2q,f}^{5-}$ of the low-pass filters of FIG. 2 are subtracted from reference values $i_{2d,ref}^{5-}$ and $i_{2q,ref}^{5-}$ of the components of the harmonic sequence in question. Typically, the reference values are zeroes, if the purpose is to compensate the harmonic sequence in question. Difference quantities thus formed are processed by a PI control algorithm, to which integrators 13 and 14 as well as gains 15, 16, 17 and 18 are associated. Blocks 19 and 20 scale the signals $i_{2d,ref}^{5-}$ and $i_{2q,ref}^{5-}$ into ones with relative values $i_{2d,ref,rel}^{5-}$ and $i_{2q,ref,rel}^{5-}$. It is to be noted that the relative presentation used herein only refers to scaling of a desired value wherein when the desired value is 100%, the compensation units understand this to be an instruction to produce, within the limits of the capacity available, a maximally large harmonic current.

A block 21 limits the length of the space vector determined by the output of the PI controllers to be between 0 . . . 100%. It is preferable to implement an anti-windup function in the system to stop integration of the PI controllers if the length of the space vector determined by them is to be restricted. The output of the block 21, $i_{1d,ref,rel,lim}^{5-}$ and $i_{1q,ref,rel,lim}^{5-}$ is the harmonic current instruction to be sent via a communications connection to the compensation units 5, 6. It is to be noted that in the exemplary case under study, the harmonic current instruction to be sent to the compensation units is presented as components of the harmonic synchronous coordinate system synchronized with the fundamental wave of the network voltage, in which case the phase angle of the harmonic current instruction is also presented in relation to the phase angle of the fundamental wave of the network voltage, as disclosed above. Further, the amplitude of the harmonic current instruction is presented on a relative scale, which is why the compensation units may generate the desired values given on an absolute scale by proportioning the relative desired values to their own nominal capacity or, alternatively, to their free capacity.

Figure 3:
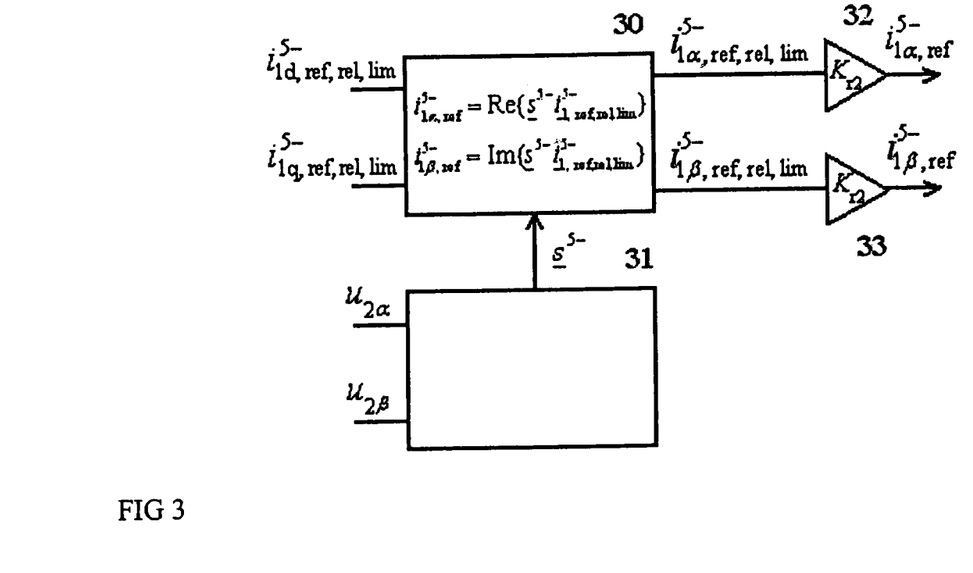
FIG. 3 is a block diagram presenting determination of a harmonic current instruction of a compensation unit according to an embodiment.

FIG. 3 shows a way in which a compensation unit, in the case of the discussed example, may determine a harmonic current instruction of a stationary coordinate system which corresponds with the desired value of the harmonic sequence and which is given on an absolute scale. A block 31 of FIG. 3 determines a unit vector $\underline{s}^{5-}$ representing a harmonic synchronous coordinate system corresponding with the desired value. It is to be noted that voltage space vector components $u_{2\alpha}$ and $u_{2\beta}$ used in determining the unit vector may be determined not only by measuring but also by estimating. As far as the invention is concerned, an essential point is that the network voltage at the access points of the compensation units is substantially the same as at the access point of the control unit. This condition is met if the electrical network connection between the control unit and the compensation units has a sufficiently low impedance.

A block 30 of FIG. 3 is a coordinate system transformation member, which transforms a current instruction given in a harmonic synchronous coordinate system to a stationary αβ-coordinate system. For the coordinate system transformation, the following equations may be used:

$$i_{1\alpha,ref,rel,lim}^{5-} = Re\{\underline{s}^{5-}\underline{i}_{1,ref,rel,lim}^{5-}\} = s_{\alpha}^{5-}i_{1d,ref,rel,lim}^{5-} - s_{\beta}^{5-}i_{1q,ref,rel,lim}^{5-} \quad (5)$$

$$i_{1\beta,ref,rel,lim}^{5-} = Im\{\underline{s}^{5-}\underline{i}_{1,ref,rel,lim}^{5-}\} = s_{\alpha}^{5-}i_{1q,ref,rel,lim}^{5-} + s_{\beta}^{5-}i_{1d,ref,rel,lim}^{5-} \quad (6)$$

Scaling blocks 32 and 33 transform the current instruction given as a relative value into an absolute value. The coefficient $K_{r2}$ in question is dependent on the nominal capacity of the compensation unit or, alternatively, on the free capacity available for the compensation. The control system of the compensation unit aims at producing a current which corresponds with the formed absolute-value references $i_{1\alpha,ref}^{5-}$ and $i_{1\beta,ref}^{5-}$ of the harmonic sequence.

In the case of the above-described example, the corresponding procedures have also to be performed on any harmonic sequences to be compensated other than the fifth harmonic negative sequence used in the exemplary case.

The system of the invention is not, however, in any way restricted to a procedure exactly similar to that described in connection with the above example for counting the harmonic current instructions or processing them in compensation units.

The system according to the invention provides a feedback control system comprising as quantities to be controlled e.g. current harmonics of an access point, as feedback information current of an access point measured by a measurement unit and harmonic components determined therefrom, as a controller a portion of a control unit determining harmonic current instructions, and as an actuator an entity formed by a combination of different compensation units and generating harmonic currents.

In order for the feedback control system to operate appropriately, it has to be tuned according to the operating environment in question. As far as the system of the invention is concerned, an essential tuning parameter is a gain coefficient by which a control unit transforms an absolute harmonic current instruction into a relative-value harmonic current instruction. In FIG. 2, the gain coefficient in question is given a symbol $K_{r1}$ in the blocks 19 and 20. An appropriate value of the gain coefficient $K_{r1}$ depends on the combined compensation capacity of the compensation units. Particularly, if the gain coefficient $K_{r1}$ is too high, in other words too great a current harmonic is requested from the compensation units regarding the situation, the control system may become instable. Therefore, the gain coefficient $K_{r1}$ is to be selected according to the maximum compensation capacity of the compensation units. If the actual compensation capability of the compensation units is lower than what was assumed when determining the gain coefficient $K_{r1}$, the control system remains stable but its dynamic performance decreases as compared to a situation wherein $K_{r1}$ is determined correctly. Such a situation easily occurs when some of the compensation units have so much other load that the capacity does not suffice to compensate the harmonics. Such a situation may, however, be considered as part of the normal operation of the system.

In view of the above, the control unit has at some accuracy to know the combined compensation capacity of the compensation units. The magnitude of the compensation capacity may be determined e.g. such that a user of the system sets parameter information about the combined compensation capacity of the compensation units for the control unit.

As another alternative in determining the compensation capacity, a bidirectional communications connection may be given. In such a case, the compensation units associated with the system communicate information about their available capacity to the control unit, which adds up the information. When such a bidirectional communications connection is used, the compensation units may communicate information about their compensation capacity once or continuously during operation.

Further, another alternative for determining the compensation capacity for the control system is to measure the compensation capacity in the control unit on the basis of electrical measurements. The control unit may identify the magnitude of the compensation capacity e.g. by commanding a 1% or another relatively low harmonic current as well as by measuring the magnitude of the generated harmonic current in absolute units. This would make it possible to directly find out an absolute value of the current to be compensated with which e.g. the above 1% current instruction corresponds. However, a disadvantage of this procedure is that the measurement necessarily increases the distortion level temporarily. Further, should the external distortion level for the harmonics in question change exactly during the measurement, it would cause an error in the compensation capacity identification result.

The measurement unit 1 and the control unit 2 of the invention may be physically separate devices or, alternatively, they may be included in one physical device. For the sake of an example, FIG. 1 shows these units as separate blocks, but it is clear that the units may be integrated. The measurement unit 1 measures or otherwise determines the necessary electrical quantities. Typical quantities to be determined are the current and voltage of an access point. The control unit 2 may be a separate device but it may also include a compensation unit, in which case they are thus included in the same physical device. It is also feasible that the measurement unit, the control unit and the compensation unit are all included in one physical device. The measurement unit may also perform signal processing procedures on measurement signals. The device in which the measurement unit, the control unit and the compensation unit are integrated is further, according to the invention, in a communications connection with other compensation units.

The compensation units may be dedicated active filters, in which case they have no other function than compensation of harmonics. The compensation units may also have a primary function, in addition to which they also function, within the limits of their capacity, as compensation units. An example of such a unit is a frequency converter provided with a network inverter, whose primary function is to supply a motor but which, within the limits of the available capacity of the network inverter, may also participate in compensating the harmonics. An obvious requirement is, however, that the control system of the compensation unit is capable of controlling the harmonics of the network current as desired.

Figure 4:
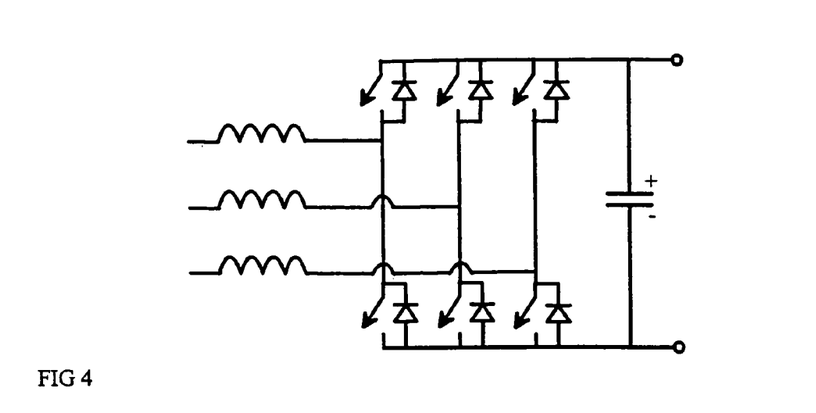
FIGS. 4 and 5 show examples of couplings capable of generating harmonic currents in a controlled manner.
Figure 5:
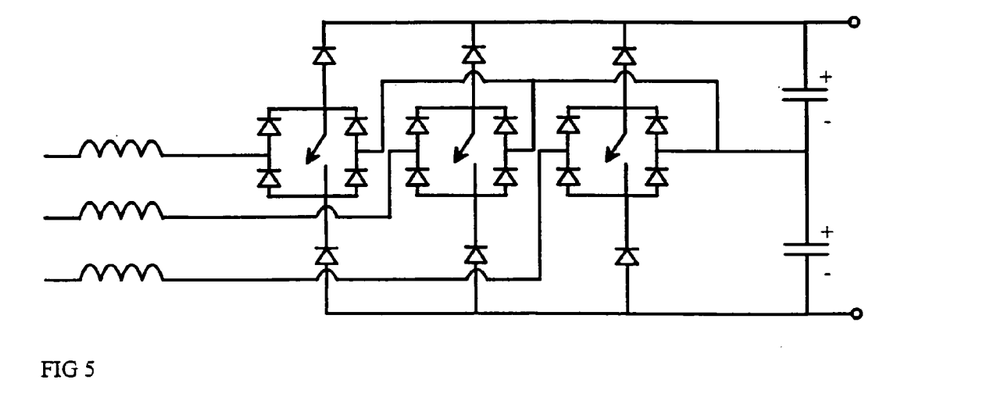

The structure of the compensation unit may be of any kind, as far as it is capable of implementing a current instruction given to it. Some embodiments of compensation units are shown in FIGS. 4 and 5. FIG. 4 shows a full converter bridge implemented by six controllable switches, and FIG. 5 shows a rectifier implemented by three active switches. Compensation units according to these embodiments, for instance, are capable of implementing harmonic current instructions and functioning at the same time as rectifiers for possible other load.

In the system according to the invention, distortion sources and the compensation units do not necessarily reside close to one another, which is why as a result of the compensation of the harmonics, more harmonic currents travel in a power cable as compared to a case wherein a compensation unit is located in the immediate vicinity of the distortion source.

Further, the system and method according to the invention are naturally only suitable to cases wherein the network is at one time supplied only from one point, in other words when the network is a radial network. The access point, i.e. a point whose current is to be compensated, is to supply the network in which the distortion sources and the compensation units reside.

The method and system according to the invention are not necessarily suitable for compensating rapidly changing harmonics. An analysis of the harmonic components takes at least as much time as one fundamental period. Consequently, it may be estimated that the compensation of a harmonic takes at least approximately 2 . . . 5 fundamental periods, depending on the tightness of the control. In practice, it may be reasonable to tune the controllers to be slower than this, e.g. for a compensation time of 5 . . . 20 fundamental periods.

In accordance with the above, the compensation units have to determine the phase angle of the fundamental wave of the network voltage in order to be capable of determining the phase angle of the desired value of the harmonic current. The determination of the fundamental wave of the network voltage may be based on measuring or estimating the network voltage. In the case of network inverters, however, the voltage is not often measured. Typically, the network voltage is still estimated directly or indirectly for controlling the reactive power. If an estimate of the network voltage is used, according to the invention, in controlling of harmonic currents, the estimate has to be relatively accurate. It is to be noted that e.g. an error of a magnitude of one degree in the phase angle of the fundamental wave of the network voltage corresponds with an error of seven degrees in the phase angle of the seventh harmonic. A particularly disadvantageous situation occurs when an error of one compensation unit in the phase angle of the harmonic current is of a different magnitude than that of another, since such an error may cause a harmonic current which circulates between the compensation units.

If a real-time communications connection is used, the above-disclosed idea of indicating the phase angle of the current instruction in relation to the phase angle of the fundamental wave of the voltage does not provide any advantage similar to that in connection with a slow communications connection. In such a case, the desired values of the harmonic currents directly given in a stationary coordinate system may be communicated to the compensation units.

Further, if the communications connection is not real-time, but the delay of the communication is constant and known, it is not necessary to indicate the phase angle of the current instruction in relation to the phase angle of the fundamental wave of the voltage in the manner described in detail above, since the compensation units may determine the phase angle of the harmonic current instruction by means of the frequency and the known communication delay of the network. Further, if the control unit and the compensation units are provided with an accurate real-time clock, single communication messages may be time-stamped, which results in the case of the previous point also in the case of an alternating communication delay.

It was disclosed above that the compensation units proportion the relationally presented harmonic amplitude instructions to their own nominal capacity or, alternatively, to their free capacity according to a given embodiment, and generate, presented on an absolute scale, the desired values for the amplitudes of the harmonics. A numeric example of each case is given below, the relative harmonic current instruction being 50%.

| Case 1: Compensation units proportion a current instruction to a nominal value | | |
| --- | --- | --- |
| Instruction | Compensation unit 1 | Compensation unit 2 |
|  | Nominal current 10 A | Nominal current 100 A |
|  | Capacity usage: | Capacity usage: |
|  | main function 6 A | main function 30 A |
|  | compensation 0 A | compensation 0 A |
|  | free 4 A | free 70 A |
| 50%⇒ | Instruction on an absolute scale 5 A | Instruction on an absolute scale 50 A |
|  | Capacity usage: | Capacity usage: |
|  | main function 6 A | main function 30 A |
|  | compensation 4 A | compensation 50 A |
|  | free 0 A | free 20 A |

Case 2: Compensation units proportion a current instruction to a free capacity

| Instruction | Compensation unit 1 | Compensation unit 2 |
|---|---|---|
| 50%⇒ | Nominal current 10 A<br>Capacity usage:<br>main function 6 A<br>compensation 0 A<br>free 4 A<br>Instruction on an<br>absolute scale 2 A<br>Capacity usage:<br>main function 6 A<br>compensation 2 A<br>free 2 A | Nominal current 100 A<br>Capacity usage:<br>main function 30 A<br>compensation 0 A<br>free 70 A<br>Instruction on an<br>absolute scale 35 A<br>Capacity usage:<br>main function 30 A<br>compensation 35 A<br>free 35 A |

In practice, proportioning the current instruction to the free capacity requires the free capacity to be determined. This may be difficult particularly in cases where the capacity of the compensation unit is dependent not only on the current-carrying capacity but also e.g. on the magnitude of the voltage reserve required for generating harmonics.

The system and method of the invention may also be used for compensating the harmonics of the voltage of the access point. This requires that the control unit determines the harmonic components of the voltage of the access point as well as, on the basis thereof, determines suitable harmonic current instructions which are communicated to the compensation units. As far as the compensation units are concerned, compensating the voltage harmonics of the access point does not differ at all from compensating the current harmonics of the access point.

A frequency analysis of the harmonic components is not necessarily based on harmonic synchronous coordinate systems but it may also be carried out by other methods, such as a discrete Fourier transformation.

The system and method of the invention may also be used for compensating a reactive power. In this case, the control unit determines a reactive power need of the access point as well as calculates a relative-value reactive power or reactive current instruction for the compensation units. The compensation units determine an absolute reactive power instruction which corresponds with the relative reactive power or reactive current instruction by means of their own nominal capacity or their free capacity and aim at generating a reactive current which corresponds with the absolute reactive power. The relative scaling used in compensating the reactive power is not necessarily the same as the scaling used in compensating the harmonics.

The compensation units may prioritize an effective power instruction, a reactive power instruction as well as instructions associated with compensating the harmonics in different ways. Typically, however, an effective power instruction has a higher priority than instructions corresponding with the reactive power and the harmonics.

The method and system according to the invention may be implemented in a simple manner by using a device according to the invention for controlling compensation of harmonic components of an electrical network and a compensation unit according to the invention for compensating the harmonic components of the electrical network. A combination of such a device and such compensation units provides a system according to the invention. A compensation unit according to the invention is configured to receive, via a communication connection and as relative values, desired values corresponding with the harmonics to be compensated, and the compensation unit is provided with means for transforming a relative-value desired value into an absolute desired value and means for generating a compensation current determined by the absolute desired value.

In order for the compensation unit of the invention to obtain a necessary and appropriate desired value, the device according to the invention comprises a measurement unit 1 configured to measure an electrical quantity of an electrical network to be compensated, and a control unit 2 configured to determine the harmonics contents of the measured electrical quantity to be compensated as well as to determine, as relative values, desired values which correspond with the harmonics to be compensated. Further, the device according to the invention comprises means for sending, as relative values, desired values to units carrying out compensation. These means may be e.g. an access interface to a communication connection, such as a necessary network card.

It is apparent to a person skilled in the art that as technology advances, the basic idea of the invention may be implemented in many different ways. The invention and its embodiments are thus not restricted to the above-described examples but may vary within the scope of the claims.

The invention claimed is:

1. A system for compensating harmonic components or a reactive power of an electrical network, the system comprising:
a measurement unit configured to measure an electrical quantity to be compensated;
a control unit configured to determine harmonics contents or a reactive power need of the measured electrical quantity to be compensated as well as to determine, as relative values, desired values corresponding with the harmonics to be compensated or the reactive power to be compensated, wherein the desired value of each harmonic amplitude to be compensated is between 0 and 100 percent;
a plurality of compensation units configured, responsive to the desired values provided by the control unit, to generate harmonic components or reactive power according to the desired values given as relative values, and each compensation unit is configured to proportion a relative-value compensation instruction to a free compensation capacity; and
a communications connection configured to communicate the desired values determined by the control unit to the plurality of compensation units.

2. A system as claimed in claim 1, wherein the control unit is configured to determine a phase angle of the desired value of the harmonic component or reactive power in relation to a phase angle of a fundamental wave of a network current, and that a compensation unit of the plurality of compensation units is configured to determine the phase angle of the fundamental wave of the network current, and to proportion the phase angle of the desired value to the phase angle of the fundamental wave determined by it.

3. A system as claimed in claim 2, wherein the control unit is configured to determine a synchronous coordinate system corresponding with the harmonic to be compensated and to synchronize the formed synchronous coordinate system with the fundamental wave of the network current to be compensated, and to determine the desired values as relative values in said synchronous coordinate system.

4. A system as claimed in claim 3, wherein the control unit is configured to transform the harmonic component to be compensated, which has been measured by the measurement unit, into a relative value by using a gain coefficient ($K_{r1}$) whose magnitude depends on a combined compensation capacity of the compensation units.

5. A system as claimed in claim 2, wherein the control unit is configured to transform the harmonic component to be compensated, which has been measured by the measurement unit, into a relative value by using a gain coefficient ($K_{r1}$) whose magnitude depends on a combined compensation capacity of the compensation units.

6. A system as claimed in claim 1, wherein the control unit is configured to transform the harmonic component to be compensated, which has been measured by the measurement unit, into a relative value by using a gain coefficient ($Kr_{r1}$) whose magnitude depends on a combined compensation capacity of the compensation units.

7. A system as claimed in claim 6, wherein the control unit is configured to receive the magnitude of the gain coefficient ($K_{r1}$) from a user, or the control unit is configured to receive information about the compensation capacity from the compensation units, or the control unit is configured to determine the compensation capacity on the basis of electrical measurements.

8. A method of compensating harmonic components or a reactive power of an electrical network, the method comprising measuring an electrical quantity to be compensated;

determining harmonics contents or a reactive power need of the measured electrical quantity to be compensated as well as determining, as relative values, desired values corresponding with the harmonics to be compensated or the reactive power to be compensated, wherein the desired value of each harmonic amplitude to be compensated is between 0 and 100 percent;

communicating the desired values to a plurality of compensation units by using a communications connection;

generating to the desired values given as responsive relative values harmonic components or reactive power according to the desired values by the plurality of compensation units; and proportioning, by each compensation unit, a relative-value compensation instruction to a free compensation capacity.

9. A method as claimed in claim 8, wherein the determining of the desired value comprises determining a phase angle of the desired value of the harmonic component or reactive power in relation to a phase angle of a fundamental wave of a network current, and determining, in each compensation unit, the phase angle of the fundamental wave of the network current, and proportioning the phase angle of the desired value to the phase angle of the fundamental wave.

10. A plurality of compensation units for compensating harmonic components of an electrical network, wherein each compensation unit is configured to receive, via a communications connection and as relative values, desired values corresponding with the harmonics to be compensated, wherein the desired value of each harmonic amplitude to be compensated is between 0 and 100 percent, and each compensation unit is configured to transform the relative-value desired value into an absolute desired value, is configured to generate a compensation current determined by the absolute desired value, and is configured to transform the relative-value desired value into the absolute desired value by proportioning the relative value to a capacity available for compensation of each compensation unit.

11. A device for controlling compensation of harmonic components or a reactive power of an electrical network, the device comprising:

a measurement unit configured to measure an electrical quantity of the electrical network to be compensated;

a control unit configured to determine harmonics contents or a reactive power need of the measured electrical quantity to be compensated as well as to determine, as relative values, desired values corresponding with the harmonics to be compensated or the reactive power to be compensated, wherein the desired value of each harmonic amplitude to be compensated is between 0 and 100 percent; and means for sending the desired values as relative values to a plurality of units carrying out compensation, and each unit carrying out compensation unit is configured to proportion a relative-value compensation instruction to a free compensation capacity.

* * * * *